United States Patent
Kaga et al.

(10) Patent No.: US 9,382,465 B2
(45) Date of Patent: Jul. 5, 2016

(54) LIQUID COOLANT COMPOSITION

(71) Applicant: CCI CORPORATION, Seki-shi, Gifu (JP)

(72) Inventors: Nobuyuki Kaga, Seki (JP); Junichiro Kimura, Seki (JP)

(73) Assignee: CCI CORPORATION, Seki-Shi (JP)

( * ) Notice: Subject to any disclaimer, the term of this patent is extended or adjusted under 35 U.S.C. 154(b) by 0 days.

(21) Appl. No.: 14/387,793

(22) PCT Filed: Mar. 26, 2013

(86) PCT No.: PCT/JP2013/058663
§ 371 (c)(1),
(2) Date: Sep. 24, 2014

(87) PCT Pub. No.: WO2013/146721
PCT Pub. Date: Oct. 3, 2013

(65) Prior Publication Data
US 2015/0152312 A1    Jun. 4, 2015

(30) Foreign Application Priority Data

Mar. 27, 2012 (JP) ................ 2012-072196

(51) Int. Cl.
*C09K 5/10* (2006.01)
*C09K 5/20* (2006.01)
*C23F 11/10* (2006.01)
*C23F 11/12* (2006.01)

(52) U.S. Cl.
CPC ... *C09K 5/20* (2013.01); *C09K 5/10* (2013.01); *C23F 11/10* (2013.01); *C23F 11/124* (2013.01)

(58) Field of Classification Search
None
See application file for complete search history.

(56) References Cited

U.S. PATENT DOCUMENTS

| | | | |
|---|---|---|---|
| 6,802,988 B1 * | 10/2004 | Wenderoth et al. | 252/73 |
| 6,818,145 B1 | 11/2004 | Miyake et al. | |
| 2006/0033077 A1 | 2/2006 | Hudgens | |
| 2009/0045376 A1 * | 2/2009 | Mori et al. | 252/75 |

FOREIGN PATENT DOCUMENTS

| | | |
|---|---|---|
| EP | 0251480 A1 | 1/1988 |
| EP | 1122290 B1 | 12/2004 |
| JP | 2002-097461 A | 4/2002 |

(Continued)

OTHER PUBLICATIONS

Notification of Transmittal of Translation of the International Preliminary Report on Patentability (PCT/IB/338) mailed Oct. 9, 2014, with International Preliminary Report on Patentability (PCT/IB/373) and Written Opinion of the International Searching Authority (PCT/ISA/237), for corresponding international application PCT/JP2013/058663.

(Continued)

*Primary Examiner* — Necholus Ogden, Jr.
(74) *Attorney, Agent, or Firm* — Law Office of Katsuhiro Arai

(57) ABSTRACT

Provide a liquid coolant composition whose base material is a glycol, wherein such liquid coolant composition contains: (a) 0.1 to 8 percent by weight of an aliphatic dicarboxylic acid having 8 to 18 carbon atoms or alkali metal salt thereof; (b) 0.1 to 10 percent by weight of an alkyl benzoic acid having 7 to 18 carbon atoms or alkali metal salt thereof; and (c) 0.1 to 5 percent by weight of an aliphatic monocarboxylic acid having 6 to 18 carbon atoms or salt thereof.

6 Claims, 1 Drawing Sheet

(56) References Cited

FOREIGN PATENT DOCUMENTS

| JP | 2002-371270 A | 12/2002 |
|---|---|---|
| JP | 2005-042138 A | 2/2005 |
| JP | 2005-187748 A | 7/2005 |
| JP | 2005-187905 A | 7/2005 |
| WO | 99/57218 A1 | 11/1999 |
| WO | 01/70901 A1 | 9/2001 |

OTHER PUBLICATIONS

International Search Report (ISR), mailed Jun. 25, 2013, issued for International application No. PCT/JP2013/058663.
Supplementary European Search Report (SESR) dated Nov. 20, 2015, issued for corresponding European patent application No. EP13768361.

* cited by examiner

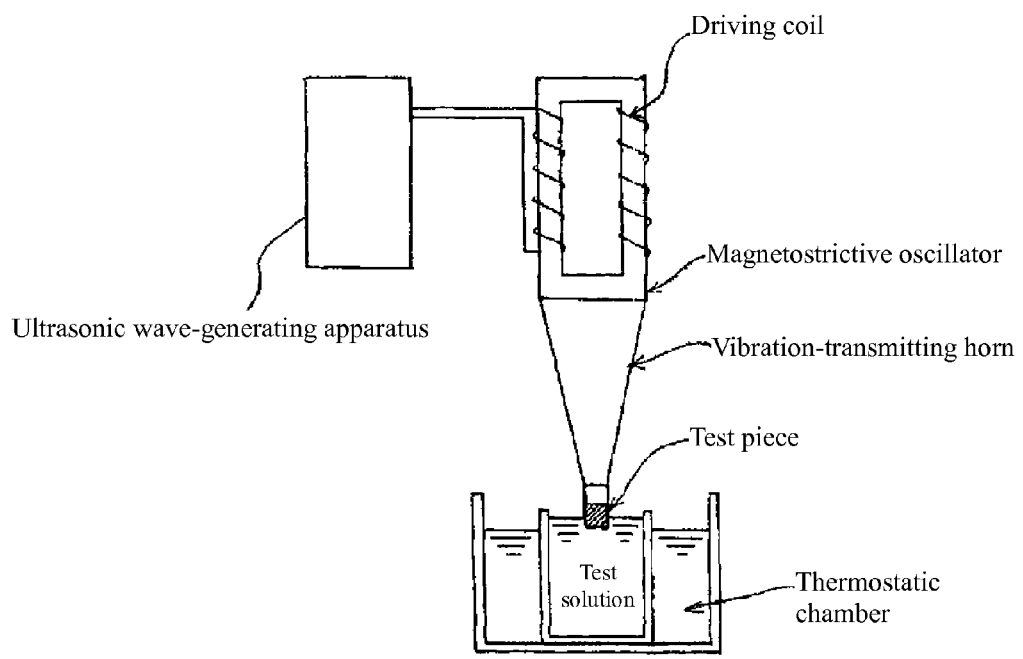

LIQUID COOLANT COMPOSITION

This application is the U.S. National Phase under 35 U.S.C. §371 of International Application PCT/JP2013/058663, filed Mar. 26, 2013, which claims priority to Japanese Patent Application No. 2012-072196, filed Mar. 27, 2012. The International Application was published under PCT Article 21(2) in a language other than English.

TECHNICAL FIELD

The present invention relates to a liquid coolant composition whose base material is a glycol.

BACKGROUND ART

Aluminum, aluminum alloy, cast iron, steel, brass, solder, copper, and other metals have traditionally been used for cooling systems of internal combustion engines, etc. In particular, aluminum or aluminum alloy is widely used in recent years for cooling system parts of internal combustion engine vehicles, electric vehicles, hybrid electric vehicles, etc., for the purpose of making the vehicle body lighter.

These metals corrode when they come in contact with water or air. As a result, liquid coolant compositions containing phosphates, borates, silicates, organic acids, and other corrosion inhibitors are used for cooling systems in order to prevent these metals from corroding.

One example of such composition is described in Patent Literature 1, which is a coolant characterized in that it is an antifreeze solution whose primary constituent is a glycol and which does not contain any borate, silicate, amine or nitrite in its composition, but which contains an aromatic monobasic acid, molybdate and/or tungstate, aliphatic bibasic acid, aliphatic monobasic acid, phosphoric acid, triazole, thiazole, or phosphonic acid.

Another liquid coolant composition is described in Patent Literature 2, which is a liquid coolant composition whose primary constituent is a glycol, characterized in that it is constituted by: (a) 0.1 to 10 percent by weight of at least one type of substance selected from aliphatic monobasic acids and salts thereof; (b) 0.1 to 10 percent by weight of at least one type of substance selected from aliphatic bibasic acids and salts thereof; (c) 0.1 to 10 percent by weight of at least one type of substance selected from aromatic monobasic acids and salts thereof; (d) 0.1 to 1 percent by weight of at least one type of nitrite; (e) 0.01 to 1.0 percent by weight of at least one type of substance selected from 2-phosphonobutane-1,2,4 tricarboxylic acids and salts thereof; and (f) 0.0001 to 0.1 percent by weight of at least one type of substance selected from strontium compounds, magnesium compounds, and calcium compounds.

However, any phosphate would react with a hard water constituent and produce sediments, meaning that diluting such liquid coolant composition with hard water produces sediments. Production of sediments not only lowers the corrosion prevention function of the coolant, but it may obstruct the cooling system as the produced sediments accumulate in the circulation paths of the cooling system.

On the other hand, any borate would be corrosive to aluminum and aluminum alloy, while any silicate would have poor stability in a liquid and therefore easily turn into a gel and separate when the temperature or pH changes or any other salt is present, thereby presenting a problem of lower corrosion prevention function.

As described above, all known metal corrosion inhibitors that effectively prevent the rusting of metal, especially aluminum or aluminum alloy, have various problems on use, and accordingly the market has been awaiting the development of a corrosion inhibitor offering excellent anti-corrosion property with respect to aluminum or aluminum alloy.

In addition, while any liquid coolant composition is diluted with water first before being charged into the cooling system, the diluted cooling water will contain dissolved air, although the amount is small. As a result, any pressure difference generating while the diluted cooling water circulates in the cooling system would produce air bubbles and these air bubbles would erode the metal surfaces, which is known as cavitation damage. Vibration would also produce air bubbles that cause cavitation damage.

In light of the aforementioned situations, a liquid coolant composition aimed at suppressing cavitation damage is proposed, as described in Patent Literature 3, which contains: an organic acid constituent containing an adipic acid, and at least one of benzoic acid and C9 to C12 aliphatic bibasic acid, or salt thereof; an anti-corrosion additive containing a molybdate, and at least one of mercaptobenzothiazole, benzotriazole, tolyl triazole, nitrite, nitrate, and silicate; a buffer solution constituent containing at least one sodium salt selected from borate and phosphate; and a freezing-point depressant.

Also known, as described in Patent Literature 4, is a coolant whose primary constituent is a glycol and which contains in its composition at least one type of substance selected from an aliphatic bibasic acid having 6 to 12 carbon atoms and alkali metal salt thereof, as well as a p-toluylic acid or alkali metal salt thereof; however, this coolant has poor lubrication property with respect to the mechanical seals of water pumps and may therefore generate squealing noises.

Furthermore, Patent Literature 5 describes a water-containing coolant, wherein deionized water obtained by separating/removing corrosive ions and scale-forming ions is adopted for the aforementioned water content to achieve greater anti-corrosion property with respect to the metals, while also suppressing the formation of scales to achieve greater lubrication performance with respect to the mechanical seals of water pumps, when the coolant is used for cooling systems of internal combustion engines, etc.

However, this liquid coolant composition, although achieving greater lubrication property through suppression of deposit production, does not improve the lubrication performance of the coolant itself.

BACKGROUND ART LITERATURE

Patent Literature

Patent Literature 1: Japanese Patent Laid-open No. 2002-371270
Patent Literature 2: Japanese Patent Laid-open No. 2005-187748
Patent Literature 3: Japanese Patent Laid-open No. 2002-97461
Patent Literature 4: WO 01/70901
Patent Literature 5: WO 99/57218

SUMMARY OF THE INVENTION

Problems to be Solved by the Invention

The object of the present invention is to obtain a coolant offering excellent anti-corrosion property and cavitation resistance with respect to aluminum, as well as excellent lubrication property with respect to the mechanical seals of coolant circulation pumps.

Means for Solving the Problems

1. A coolant whose base material is a glycol, wherein such liquid coolant composition contains:
   (a) 0.1 to 8 percent by weight of an aliphatic dicarboxylic acid having 8 to 18 carbon atoms or alkali metal salt thereof;
   (b) 0.1 to 10 percent by weight of an alkyl benzoic acid having 7 to 18 carbon atoms or alkali metal salt thereof; and
   (c) 0.1 to 5 percent by weight of an aliphatic monocarboxylic acid having 6 to 18 carbon atoms or salt thereof.
2. A liquid coolant composition according to Claim 1, wherein the aliphatic dicarboxylic acid is a sebacic acid.
3. A liquid coolant composition according to Claim 1 or 2, wherein the alkyl benzoic acid is a p-toluylic acid.
4. A liquid coolant composition according to any one of Claims 1 to 3, characterized in that it does not contain any amine, silicate, borate, phosphate or nitrite.

Effects of the Invention

According to the present invention, a liquid coolant composition offering excellent anti-corrosion property and cavitation resistance with respect to aluminum, as well as excellent lubrication property with respect to the mechanical seals of coolant circulation pumps, can be obtained.

BRIEF DESCRIPTION OF THE DRAWINGS

FIG. 1 Schematic diagram of a testing apparatus for testing the cavitation damage prevention performance according to the magnetostrictive vibration method

MODE FOR CARRYING OUT THE INVENTION

The present invention is specifically described below.

It should be noted that the term "liquid coolant composition" used in connection with the present invention refers to a composition that means both a so-called concentrate which will be diluted with water, etc., before use, and a dilution ready for use as coolant obtained by diluting such concentrate with water, etc.

Glycol

Under the present invention, at least one type of glycol is used as selected from ethylene glycol, propylene glycol, 1,3-butylene glycol, hexylene glycol, diethylene glycol, and glycerin, among which ethylene glycol or propylene glycol is particularly preferred.

Aliphatic Dicarboxylic Acid Having 8 to 18 Carbon Atoms or Alkali Metal Salt Thereof (a) The aliphatic dicarboxylic acid having 8 to 18 carbon atoms or alkali metal salt thereof represents the (a) constituent in the composition of the present invention, or specifically an aliphatic dicarboxylic acid or alkali metal salt or ammonium salt thereof having excellent anti-corrosion property with respect to iron and aluminum metals. By combining one or a mixture of two or more types of substances selected from this (a) constituent, with the (b) constituent and (c) constituent described below, excellent cavitation damage suppression effect with respect to cast iron and steel is demonstrated.

For the aliphatic dicarboxylic acid, oxalic acid, malonic acid, succinic acid, gultaric acid, adipic acid, piperinic acid, suberic acid, azelaic acid, sebacic acid, undecane-2 acid, dodecane-2 acid, brassylic acid, thapsic acid, or alkali metal salt or ammonium salt thereof, etc., may be used alone or two or more types may be used together. Among others, suberic acid, azelaic acid, sebacic acid, undecane-2 acid, and dodecane-2 acid are more preferable as they offer excellent performance for the items described above.

The (a) constituent above is contained by a range of 0.1 to 8 percent by weight in the liquid coolant composition. If the content of the (a) constituent is less than 0.1 percent by weight, sufficient anti-corrosion property with respect to iron and aluminum metals and sufficient cavitation damage suppression effect with respect to cast iron and steel cannot be expected; whereas, containing this constituent by more than 8.0 percent by weight is uneconomical because any improvement in effect is not proportional to the increase in content in excess of 8.0 percent by weight.

Alkyl Benzoic Acid Having 7 to 18 Carbon Atoms or Alkali Metal Salt Thereof (b) For the alkyl benzoic acid having 7 to 18 carbon atoms or alkali metal salt thereof, one offering excellent anti-corrosion property with respect to iron and aluminum metals can be used favorably. In addition, by combining one or a mixture of two or more types of substances selected from this (b) constituent, with the (a) constituent described above and (c) constituent described below, excellent cavitation damage suppression effect with respect to cast iron and steel is demonstrated.

For the alkyl benzoic acid having 7 to 18 carbon atoms or alkali metal salt thereof, benzoic acid, nitrobenzoic acid, hydroxybenzoic acid or other benzoic acid, p-toluylic acid, p-ethyl benzoic acid, p-propyl benzoic acid, p-isopropyl benzoic acid, p-tert butyl benzoic acid or other alkyl benzoic acid, alkoxy benzoic acid expressed by the general formula RO—$C_6H_4$—COOH (where R is an alkyl group of $C_1$ to $C_5$), cinnamic acid expressed by the general formula R—$C_6H_4$—CH=COOH (where R is an alkyl group or alkoxy group of $C_1$ to $C_5$), alkyl cinnamic acid, alkoxy cinnamic acid, or alkali metal salt or ammonium salt thereof, etc., may be used alone or two or more types may be used together. Among others, benzoic acid, p-toluylic acid and p-tert butyl benzoic acid offer excellent anti-corrosion performance with respect to aluminum or aluminum alloy and therefore it is desirable that at least one type of these acids be contained.

The (b) constituent above is contained by a range of 0.1 to 10 percent by weight in the liquid coolant composition. If the content of the (b) constituent is less than 0.1 percent by weight, sufficient anti-corrosion property with respect to iron and aluminum metals and sufficient cavitation damage suppression effect with respect to cast iron and steel cannot be expected; whereas, containing this constituent by more than 10 percent by weight is uneconomical because any improvement in effect is not proportional to the increase in content in excess of 10 percent by weight.

Aliphatic Monocarboxylic Acid Having 6 to 18 Carbon Atoms or Salt Thereof

For the aliphatic monocarboxylic acid having 6 to 18 carbon atoms or salt thereof in (c), pentanoic acid, hexanoic acid, heptanoic acid, octanoic acid, 2-ethyl hexanoic acid, valproic acid, 2-methyl heptanoic acid, nonanoic acid, 4-methyl octanoic acid, 3,5,5-trimethyl hexanoic acid, decanoic acid, isodecanoic acid, neodecanoic acid, 4-ethyl octanoic acid, 4-methyl nonanoic acid, undecaonic acid, dodecanoic acid, tridecanoic acid, isotridecanoic acid, myristic acid, isomyristic acid, palmitic acid, isopalmitic acid, oleic acid, linoleic acid, linolenic acid, ricinoleic acid, stearic acid, isostearic acid, isoarachidic acid, or alkali metal salt or ammonium salt thereof, etc., may be used alone or two or more types may be used together.

The aliphatic monocarboxylic acid having 6 to 18 carbon atoms or salt thereof is contained by a range of 0.1 to 5 percent by weight in the liquid coolant composition. If the content of the aliphatic monocarboxylic acid having 6 to 18 carbon atoms or salt thereof is less than 0.1 percent by weight, sufficient anti-corrosion property with respect to aluminum and iron metals and sufficient cavitation damage suppression effect with respect to iron metals cannot be expected; whereas, containing this constituent by more than 5 percent by weight is uneconomical because any improvement in effect is not proportional to the increase in content in excess of 5 percent by weight.

However, it is desirable that no amine, silicate, borate, phosphate, or nitrite be contained under the present invention.

By not adding any amine or amine salt, production of nitrosoamines can be prevented even when nitrite is added.

By not adding any silicate, problems caused by addition of silicate, such as lower stability in the coolant, gelling tendency upon temperature or pH change or in the presence of other salt, and lower anti-corrosion function, can be prevented.

By not containing any borate, corrosion by borate of aluminum and alloy thereof can be prevented, which in turn prevents the problem of the anti-corrosion property of the liquid coolant composition dropping quickly.

By not containing any phosphate, production of sediments as a result of phosphate reacting with the hard water constituent in the coolant can be prevented, which in turn prevents the anti-corrosion function of the coolant from dropping and the circulation paths of the cooling system from being obstructed by accumulated sediments.

Nitrite is a very effective anti-cavitation constituent that forms film on the metal surfaces, particularly iron surfaces, in a diesel engine to prevent erosion by air bubbles by means of this film, but it is also known to react with amine salts to produce nitrosoamines that are carcinogens. By not using any nitrite, production of nitrosoamines can be prevented.

Other Additives

For other additives, not only defoaming agent and coloring agent, but also molybdate, tungstate, triazole, and thiazole can be adopted. Furthermore, hydroxides of normal alkaline substances, preferably of sodium, potassium, and other alkali metal salts, are used to adjust the pH level. The pH level is adjusted to a range of 6.5 to 9.0, or preferably to a range of 7.0 to 9.0. Defoaming agent can be added to this coolant.

In addition, triazoles that can be used under the present invention include benzotriazole, tolyl triazole, 4-phenyl-1,2,3-triazole, 2-naphthotriazole, 4-nitrobenzotriazole and salt thereof, which may be used alone or two or more types may be mixed together. The additive quantity of a triazole is in a range of 0.01 to 3 percent by weight, or preferably 0.05 to 1 percent by weight.

If the triazole content is less than 0.01 percent by weight, anti-corrosion performance, particularly that with respect to copper metals, cannot be demonstrated; whereas, adding a triazole by more than 3 percent by weight is useless because no further increase in anti-corrosion effect will be observed.

Thiazoles that can be used under the present invention include mercaptobenzothiazole and salt thereof. Only a trace amount of thiazole is sufficient, so the additive quantity is in a range of 0.01 to 2 percent by weight, or preferably 0.05 to 1 percent by weight. Still, a content less than 0.01 percent by weight will not achieve the specified anti-corrosion performance, particularly with respect to copper metals; whereas, adding a thiazole by more than 2 percent by weight is useless because no change in increased anti-corrosion effect will be observed.

EXAMPLES

The effects of the present invention are shown based on examples and comparative examples.

The compositional constituents used in Examples 1 and 2 and Comparative Examples 1 and 2, and the test results, are shown in Table 1 below.

TABLE 1

| | Item | Example 1 | Example 2 | Comparative Example 1 | Comparative Example 2 |
|---|---|---|---|---|---|
| Composition (wt %) | Ion-exchanged water | 2.4 | 2.5 | 2.5 | 2.4 |
| | Sebacic acid | 2.0 | 2.0 | 0.3 | 2.0 |
| | p-toluylic acid | 0.7 | 0.7 | — | 2.0 |
| | 2-ethyl hexanoic acid | 1.0 | — | 4.0 | — |
| | Isostearic acid | — | 1.0 | — | — |
| | Tolyl triazole | 0.3 | 0.3 | 0.2 | 0.3 |
| | Potassium hydroxide | 1.8 | 1.5 | 1.7 | 2.0 |
| | Ethylene glycol | Remainder | Remainder | Remainder | Remainder |
| pH (50 vol % aqueous solution) | | 7.9 | 7.9 | 8.4 | 8.2 |
| Coefficient of friction ×$10^{-5}$ | | 2.3 | 1.8 | 2.7 | 5.5 |
| Decrease in mass in cavitation test (mg) | | 29.8 | 36.4 | 120.9 | 37.5 |

Test Methods

Coefficient of Friction

A vertical load of 30 N was applied to SiC mechanical seals and the rotational torque between the seals was measured at a number of revolutions of 200 rpm in the sample solution at 100° C. to calculate the coefficient of friction.

Cavitation Test

Cavitation damage prevention performance test was conducted using the apparatus shown in FIG. 1 according to the magnetostrictive vibration method under the conditions shown in Table 2.

TABLE 2

| Test item | Test condition |
|---|---|
| Frequency | 19 kHz |
| Amplitude | 30 μm |
| Test piece material | FC200 (cast iron) |
| Test piece dimensions | Circular shape of 16 mm in diameter |
| Concentration of sample | 20% aqueous solution prepared according to JIS |
| Liquid volume | 500 ml |
| Liquid temperature | 50° C. |
| Soak depth | 4 mm |

Although the pH values in Examples 1 and 2 and Comparative Examples 1 and 2 are equivalent, the coefficients of friction are lower in Examples 1 and 2, confirming that coolants based on these compositions will offer excellent lubrication property with respect to the mechanical seals of circulation pumps, etc.

Comparative Example 1 is an example where the (b) constituent under the present invention was not contained, and as is evident from this example, it showed poor results, especially for the cavitation test. On the other hand, Comparative Example 2 where the (c) constituent of the present invention was not contained clearly led to lower lubrication property than in the Examples, as indicated by the high coefficient of friction of $5.5 \times 10^{-5}$.

In addition, Examples 1 and 2 according to the present invention resulted in very small decreases in mass in the cavitation test because a small amount of air contained in the cooling water could prevent cavitation damage from occurring. On the other hand, it is understood that Comparative Examples 1 and 2 caused cavitation to occur more frequently, which is evident from the significant decreases in mass in the cavitation test as shown above.

The effects in either one of the friction test and cavitation test alone of the present invention characterized in particular by containing both the (b) constituent and (c) constituent in addition to the (a) constituent are not a simple sum of the effects of Comparative Examples 1 and 2 where only one of these (b) constituent and (c) constituent was used, but they are markedly better than the results of either Comparative Example 1 or 2.

The invention claimed is:

1. A liquid coolant composition whose base material is a glycol, the liquid coolant composition comprising:
   (a) 0.1 to 8 percent by weight of an aliphatic dicarboxylic acid having 8 to 18 carbon atoms or alkali metal salt thereof;
   (b) 0.1 to 10 percent by weight of an alkyl benzoic acid having 7 to 18 carbon atoms or alkali metal salt thereof, wherein the alkyl benzoic acid is p-toluylic acid; and
   (c) 0.1 to 5 percent by weight of an aliphatic monocarboxylic acid having 6 to 18 carbon atoms or salt thereof.

2. A liquid coolant composition according to claim 1, wherein the aliphatic dicarboxylic acid is a sebacic acid.

3. A liquid coolant composition according to claim 1, characterized by not containing any amine, silicate, borate, phosphate, or nitrite.

4. A liquid coolant composition according to claim 2, characterized by not containing any amine, silicate, borate, phosphate, or nitrite.

5. A liquid coolant composition according to claim 1, wherein the aliphatic dicarboxylic acid is sebacic acid, the alkyl benzoic acid is p-toluylic acid, and the aliphatic monocarboxylic acid is 2-ethyl hexanoic acid, isostearic acid, or a mixture of 2-ethyl hexanoic acid and isostearic acid.

6. A liquid coolant composition according to claim 5, which does not contain any amine, silicate, borate, phosphate, or nitrite.

* * * * *